Jan. 4, 1966 H. BAKER 3,227,509
DEVICE FOR PROJECTION AND PHOTOGRAPHY OF BACKGROUNDS
Filed May 31, 1962 3 Sheets-Sheet 1
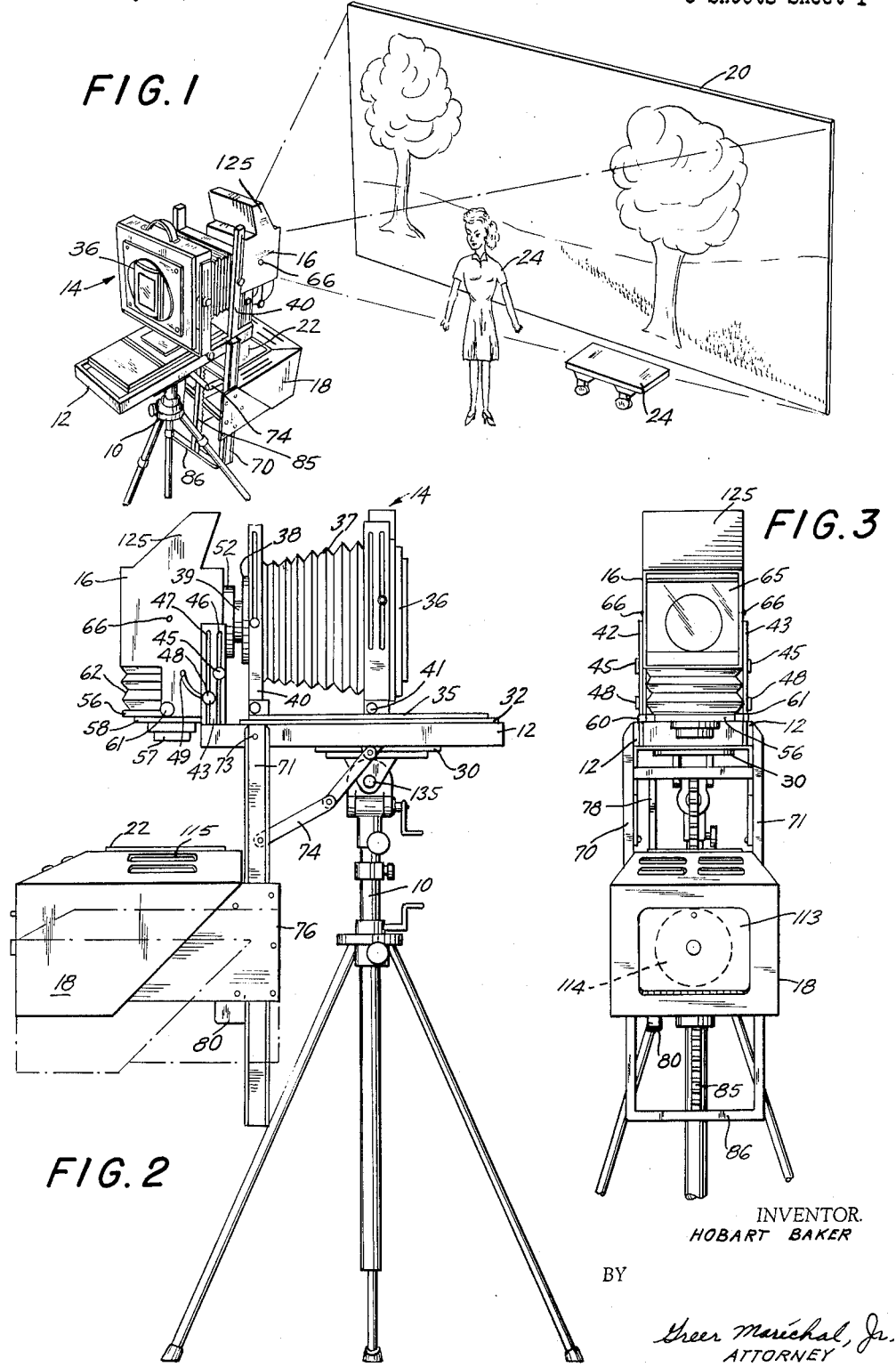
INVENTOR.
HOBART BAKER
BY
Greer Maréchal, Jr.
ATTORNEY

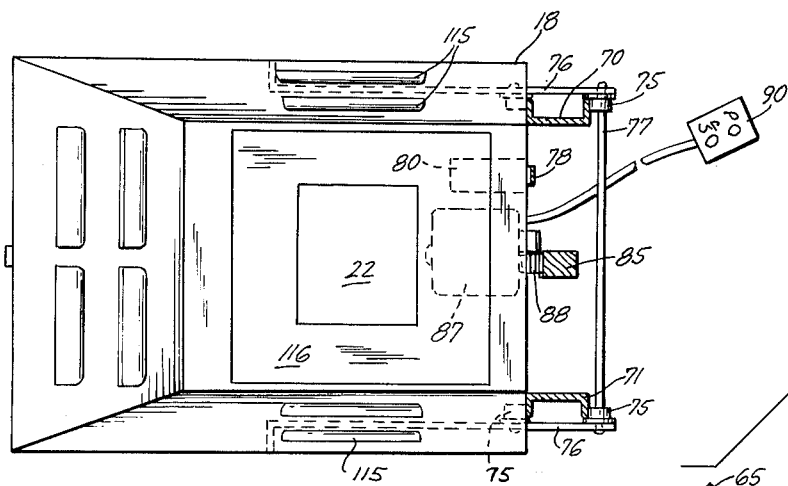

Jan. 4, 1966    H. BAKER    3,227,509
DEVICE FOR PROJECTION AND PHOTOGRAPHY OF BACKGROUNDS
Filed May 31, 1962    3 Sheets-Sheet 3

INVENTOR.
HOBART BAKER
BY
Greer Maréchal, Jr.
ATTORNEY

United States Patent Office 3,227,509
Patented Jan. 4, 1966

3,227,509
DEVICE FOR PROJECTION AND PHOTOGRAPHY
OF BACKGROUNDS
Hobart Baker, 191 Grand Central Ave., Amityville, N.Y.
Filed May 31, 1962, Ser. No. 198,927
21 Claims. (Cl. 352—89)

This invention relates to the projection of a light image on a screen against or in front of which may be photographed people or objects so as to produce a composite photographic image including both the actual people or objects and the projected image on the screen as a part of a single photographic result and, more particularly, to the production of projected background effects for such composite photographs in which the projected background image is generated from a projector associated or co-axially aligned with the photographic camera and is projected against a screen behind the actual people or objects being photographed but from a position in front of both the actual objects and the projection screen.

The utilization of synthetic or projected photographic backgrounds against which actors or models or objects are photographed has long been recognized and desirable in various fields of commercial photography, including both motion picture and still photography, for advertising, fashion, etc. Substantial artistic and commercial advantages may obtain from producing by projection in a studio an outdoor background of some remote location, against which models can be posed or actors photographed, rather than having to transport the photographer and the models or actors or objects to the particular remote location desired as a background for a particular scene or photograph. Although such techniques of "process photography" have long been used with varying results in the motion picture industry, and, to an appreciably less extent, in the production of television programs, the economies and advantages incident to such techniques may also be readily applicable to the commercial field of still photography, provided that practicable techniques or apparatus are available for advantageous results within the confining economic and physical limitations of a conventional still photographer's studio.

Perhaps the greatest development in the art of producing photographically projected backgrounds against which actors or models or objects may be photographed has related, in both motion pictures and still photography, to so-called "rear projection" techniques in which the background image or scene is projected onto a translucent screen from a conventional projector, but with the projector placed behind the screen. In such instances, the particular scene or arrangement to be photographed is posed in the usual manner in front of the translucent screen with the projected image thereon, and a photograph taken in the usual way. In utilizing such techniques, however, a variety of difficulties immediately exhibit themselves for the commercial photographer. In the first place, there is the danger that the lighting required for the objects in front of the projection screen may tend to eliminate or diminish the intensity or contrast of part of the background image projected on the screen. Also, thinking in terms of a background screen of perhaps 9' x 12', rear projection techniques utilized therewith require sufficient space in the photographer's studio behind the screen to permit the establishing of a projector far enough away from the screen to produce an image large enough to cover the whole screen.

Similarly, if it is attempted to project the background image on the screen from a projector placed in front of the screen, difficulty may be experienced again in achieving the desired final photographic results in connection with the placement of models or objects in front of the screen within the view of the camera without such models or objects also reflecting a portion of the projected background or casting shadows thereon. Even if so-called "split beam" techniques are utilized for front projection of backgrounds into composite photographic effects, a number of other difficulties may be encountered. As now well understood in this art, such "split beam" techniques include placing a projector for the background image so that the axis of the projection lens thereof is substantially perpendicular to the axis of the lens of the camera through which the composite photograph is to be recorded, and placing a semi-transparent (or semi-reflecting) sheet or mirror at substantially 45° to both the camera lens and the projector lens whereby the image from the projector is reflected by the mirror toward the screen, while the camera records the desired photograph of real objects in front of the screen and reflected projected image on the screen directly through the semi-transparent mirror.

If it is attempted to use such an arrangement, inordinately time-consuming adjustments may have to be made if the camera and projector are separate (because of the inevitable necessity for adjustments of both) in order that the real objects in front of the screen do not cast shadows or otherwise interfere with the image being projected past or around them. Other difficulties may relate to the fact that certain extraneous light may be reflected from the wrong side of the semi-transparent or semi-reflecting mirror surfaces to produce either unwanted double images or halos on the final recorded photographic film or shadows of the objects on the projected image disruptive of the illusory composite effect desired. Such difficulties may become of prime or critical economic importance as the virtual infinitude of permutations and combinations of separate adjustments utilizes more and more time in a commercial situation where profitable operation within a given cost budget may not tolerate the time cost of achieving the desired result and/or where the actual cost (in terms of time and expense of the photographer and the models and directors, etc.) of achieving the desired result with a projected background actually negates whatever savings might be expected by using a projected background in a studio instead of taking everybody out "on location" to shoot the scene in front of the desired real background in the first place.

According to this invention, however, there are provided techniques and apparatus for producing such composite photographs against projected backgrounds and without the necessary studio space which would be required for conventional rear projection of such backgrounds, without the difficulties of lighting, etc., inevitably of significance in rear projection techniques; and with unitary apparatus for coordinating conventional camera equipment in a conventional studio to produce the desired results with a minimum of "set-up" time using integrated and aligned or self-aligning camera and projection equipment or apparatus of maximum versatility and minimum adjustments for a wide variety of photographic effects. As further features of this invention may be noted integrated and self-aligning apparatus with which conventional cameras may be utilized in conventional studios without special requirements or control, yet which apparatus automatically produces the desired projector-camera alignments, precludes undesired ghost image reflections or halos or shadows, and accommodates with a minimum of adjustment and a maximum of flexibility a wide variety of the permutations and combinations of swings and tilts and other adjustments normally encountered or desired in commercial still photography without imposing substantial limits on the versatility of the photographer or his conventional apparatus in a conventional size studio. All the foregoing are available to produce a wide variety of projected backgrounds against which the photographer may produce virtually any desired composite photograph in black and white or color and in accordance with his normal training and color and lighting techniques and values conventionally and routinely utilized in indoor commercial photography.

One object of this invention is to provide integrated apparatus of the character described for association with conventional studio cameras in conventional photographic studios, to produce composite photographs of whatever people or objects may be desired against a projected background image with a minimum of adjustment or special knowledge or training being required and with a maximum of flexibility of camera adjustment and normal studio lighting of the real objects being photographed against the projected background.

Another object of this invention is to provide an integrated combination device of the character described for association in standard commercial photographic studio techniques with conventional cameras and conventional photographic operations, which combination device includes projection and focusing and "split beam" means in a single unit and adapted for producing the desired projected background on suitable projection screen from a projection point adjacent the camera and coaxial with the lens thereof, and regardless of the particular positioning of the camera with respect to the projection screen or the actual objects being photographed in front thereof and notwithstanding a wide variety of swings or tilts to which the camera may normally be subjected in accordance with standard and conventional photographic or artistic techniques to produce the desired angle or composition or effect with the actual people or objects being photographed against the projected background.

A further object of this invention is to provide an arrangement of apparatus of the character described as a versatile integrated device including projection and split beam and adjusting means for sale and utilization as a unit and adapted for immediate application to conventional commercial photographic studio apparatus and conditions substantially without requiring alteration of either the conventional studio equipment or conventional photographic techniques to provide such front background projection for making such composite photographs.

Still another object of this invention is to provide unitary and integrated apparatus including projections means and split beam means, for association with conventional photographic cameras, and whereby the unitary apparatus as manufactured includes both a multiplicity of vertical, horizontal, tilting and planar adjustments for accommodating a wide variety of camera angles and arrangements, and also includes built-in arrangements for establishing and maintaining perpendicular intersection of projector lens axis with camera lens properly to achieve the results desired in accordance herewith and notwithstanding inevitable or routine camera or camera angle adjustment or projector focusing.

A still further object of this invention is to provide integrated or unitary apparatus of the character described arranged for application to standard commerical studio camera stands or tripods and adapted to receive conventional photographic cameras of any of a wide variety of sizes, which apparatus includes a projector device readily movable thereon for focusing of a projected image, as well as for changing the projected size of the image, a semi-transparent beam splitting device integrated with the projector means and with means for receiving in a predetermined alignment the photographic camera; and which apparatus also includes alignment-maintaining and adjusting mechanism for automatically establishing and maintaining axial alignments of projection and camera lenses throughout a variety of independently arranged swings and tilts of both projection and camera lenses and projector and camera film planes, and focusing and size adjustments of both the camera photographic image and the projected image.

Other objects and advantages of this invention will be apparent from the following description, the accompanying drawings, and the appended claims.

In the drawings:

FIG. 1 is a perspective view of apparatus embodying and for practicing this invention in use in a photographic studio for obtaining a composite photograph of actual people or objects against and integrated with a projected background;

FIG. 2 is a side view of apparatus embodying and for practicing this invention as mounted on a camera stand and integrated with a conventional photographic camera;

FIG. 3 is a front view of the apparatus of FIG. 2 but with the camera removed;

FIG. 4 is a top view of the projector housing portion of the apparatus of FIGS. 1–3;

FIG. 5 is a longitudinal vertical section through the apparatus of FIG. 4;

FIG. 6 is a transverse vertical section through the apparatus of FIG. 5 along the line 6—6 thereof;

FIG. 7 is a detailed partial sectional view of the camera mounting;

FIG. 8 is a diagrammatic view of the integrated arrangments of the various component optical parts of the apparatus of FIG. 2;

Figure 9:
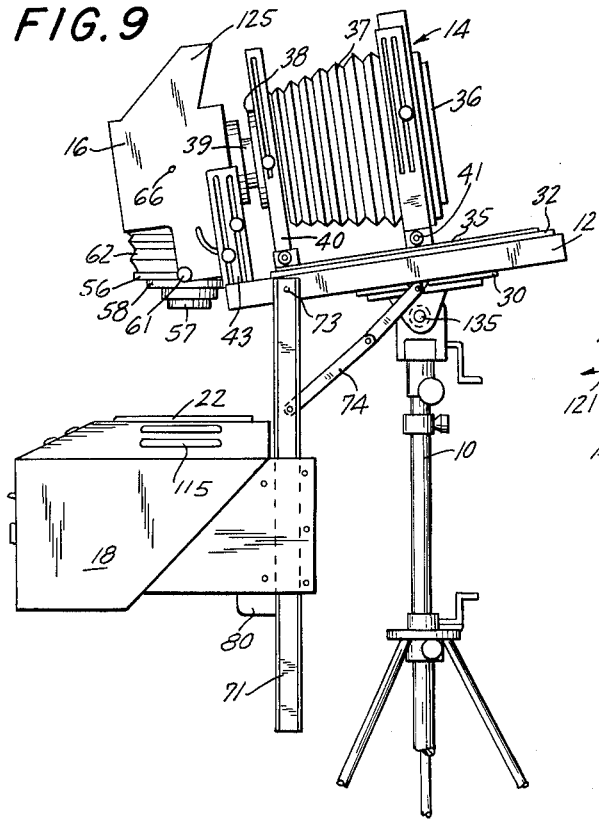
FIG. 9 is a view similar to FIG. 2 but showing the apparatus adjusted with the camera tipped down to photograph a scene from above and indicating the concomitant orientations of the other portions of the apparatus in such a photographic situation.

Referring to the drawings, in which like reference characters refer to like parts throughout the several views thereof, there is shown in FIG. 1 a perspective view of apparatus embodying and for practicing this invention in use in a photographic studio and substantially as arranged in the making of composite photographs of the character to which this invention relates. In the illustrated arrangement, there is mounted on a conventional photographic tripod or camera stand 10 a main frame structure 12 on which is adjustably supported a conventional photographic camera indicated generally at 14. Also carried by main frame 12 is a housing 16 (containing the semi-transparent reflector, the projection lens, and a light trap as hereinafter described) through which the camera 14 records the composite image to be photographed. Depending from main frame 12 is a background projector unit indicated generally at 18 and described in more detail hereafter.

A projection screen 20, of highly directional and efficient reflectivity is positioned in the studio opposite the apparatus just described for receiving a light image projected from a photographic transparency 22 by projector 18 through housing 16. In front of the screen 20 and the projected background image thereon are arranged whatever objects or models or people (indicated generally by the numeral 24) it may be desired to photograph against the projected background on screen 20, and, in the manner to be described, a photograph is recorded by camera 14 of objects 24 in front of the projected background image on screen 20 in a composite manner to give the appearance that the people or objects 24 were actually posed in front of or as a part of whatever scene or background is projected on screen 20.

Referring more particularly to FIGS. 2–7, frame 12 is illustrated as including a mounting panel 30 to be affixed as by conventional bolts or screws 31 to the camera-mounting fixtures at the top of a conventional tripod or camera stand 10 to be rigidly held thereon just as a conventional photographic camera would be and to partake of whatever conventional adjusting movements are incorporated in the tripod head regarding raising or tilting of frame 12 and all of the various apparatus associated therewith or mounted thereon. Slidably mounted on main frame 12 and somewhat spaced above mounting plate 30 (see FIG. 7) is a camera mounting plate 32 for receiving and supporting camera 14 thereon and including the usual tripod mounting screws 33 for accommodating any of a variety of photographic cameras, and with the camera plate 32 being slidable along main frame 12 so as adjustably to position any of a variety of different sizes of cameras 14 with respect to housing 16 as described below.

The photographic camera 14 is shown as somewhat diagrammatically illustrative of a conventional studio view camera and including a base 35, to be affixed to camera plate 32, on which is mounted a conventional film-holding back 36 including a ground glass screen for viewing the scene to be photographed through the camera lens prior to inserting photographic film, conventional bellows 37, and a front lens mounting 38 in which is secured the camera lens 39 is known and conventional manner, and with adjustable supports 40 and 41 for focusing and otherwise adjusting the camera as by raising or lowering or tilting lens mounting 38 or moving it and/or back 36 horizontally on base 35 for focusing.

The beam-splitter and lens housing 16 is adjustably supported and mounted on main frame 12 as by being carried between uprights 42 and 43 fixed at one end of frame 12 for both vertical and tilting adjustment with respect thereto. In the illustrated embodiment, such adjustable mounting of housing 16 between uprights 42 and 43 is indicated as including a cross rod 45 engaging slots 46 in uprights 42 and 43 and having adjusting nuts threaded on opposite ends of rod 45 so that adjustment of the positioning of housing 16 is achieved by loosening and moving and then tightening the nuts on rod 45. Also, rod 45 is disposed with respect to housing 16 to form the axis of vertical pivoting movements through which housing 16 is to be adjustable (compare FIGS. 8 and 10). In parallel vertical slots 47 in uprights 42 and 43 are positioned locking screws 48 on each side of housing 16 and engaged in arcuate slots 49 in each side of the housing.

As will be understood, the vertical positioning of housing 16 with respect to uprights 42 and 43 and main frame 12 is readily adjusted by loosening the various lock nuts, moving the housing to the desired height, and tightening the screws 48 on each side and those at the ends of rod 45. Similarly, for vertical tilting of housing 16 about the axis of rod 45, the nut at the ends thereof may be loosened and the housing tilted to any of a wide variety of positions as screws 48 move vertically in slots 47 and horizontally in arcuate slots 49, and then tightened in any position desired. Thus, the vertical height of housing 16 is adjusted to accommodate the height of camera lens 39 above main frame 12, while the tilting movements of housing 16 accommodate whatever swings or tilts are desired for camera 14 as described below. In the back of housing 16 (i.e., the side facing camera 14) there is provided an opening to receive camera lens 39 therein, which opening is encompassed by a conventional lens holder device including an annular collar 52 having therein an adjustable diaphragm 53 which may be closed down on the front end of camera lens 39 to assure the absolute centering of camera lens 39 in the lens holder and lens opening of housing 16 and regardless of variations in the diameters of various lenses 39 for various cameras.

On the lower part of housing 16 and on an axis substantially perpendicular to the axis of camera lens holder 52—53, there is provided a mounting board 56 for a conventional projector lens 57, which mounting may include another conventional lens holder having an annular collar 58 and an adjustable lens holding diaphragm 59 therein. Lens holder 56 is mounted in housing 16 for pivoting adjustment about the central horizontal axis of holder 56 by pivoting about set screws 60 and 61, with the lens mounting 56 being flexibly connected in light-tight fashion with the remainder of housing 16 as by conventional bellows 62, all in known manner.

Mounted diagonally within housing 16 is a semi-transparent reflector or "beam-splitter" or pellicle 65 which comprises, in known and conventional manner, a transparent (or semi-transparent) sheet or plate one or both surfaces of which are especially treated to reflect a portion only of light falling thereon, rather than transmitting all of it through the transparent sheet. Such "beam-splitters" are well known and conventionally produced by coating one or both surfaces of a transparent plate with one or more thin films of metallic or non-metallic materials that transmit and reflect light of all wave lengths approximately equally. The proportion of light transmitted or reflected depends on the thickness of the film, as well understood, and may vary within wide limits for satisfactory results in connection herewith. Although the beam-splitter 65 may be coated glass or a piece of optically transparent coated plastic of a thickness so as to be self-sustaining, it is much preferred in accordance herewith to use a film pellicle to avoid double images from the opposite surfaces of a thick sheet, which pellicles, as well known, are extremely thin transparent plastic sheets stretched over frames and coated on one or both sides with a semi-reflecting film to achieve the desired proportioning of transmitted and reflected light.

Beam-splitter 65 is arranged in housing 16 so as to transmit and reflect a portion of the light striking the beam-splitter along the axes of both projection lens 57 and camera lens 39. Preferably, tracks (not shown) are provided in housing 16 to receive opposite side edges of beam-splitter 65 in a readily removable and replaceable manner, and in any case, beam-splitter 65 is mounted for pivoting adjustment about the horizontal center axis thereof (as described below) and as indicated by adjustable pivot screws 66.

Projector housing 18 is suspended below main frame 12, and in the illustrated embodiment, is mounted and supported on depending rails 70 and 71 pivotally mounted on main frame 12 as at 72 and 73. A collapsing linkage 74 with a friction pivot is provided so that rails 70 and 71 may be moved or swung about the axes of pivots 72 and 73, to form any angle desired between rails 70–71 and main frame 12, and with friction joint linkage 74 holding rails 70 and 71 at whatever angle they may be placed with respect to main frame 12. As indicated particularly in FIGS. 4 and 5, projector housing 18 is mounted on depending rails 70 and 71 for vertical movement with respect thereto as by a plurality of wheels or bearing 75 mounted in sets on side flanges 76 at both sides of projector housing 18 and connected by a bracing cross rod 77. Bearings 75, as illustrated, are also arranged on both sides of depending rails 70 and 71, whereby housing 18 is free to run up and down on depending rails 70 and 71 as a supporting track therefor and in a manner so that the top of projector 18 and transparency 22 thereon extend perpendicular to rails 70 and 71 as illustrated in the drawings.

As partial support for the weight of projector housing 18 on the freely rotating bearings 75, a conventional reeled counterbalance spring 78 is affixed to the upper portion of rails 70 and 71, as by cross bars 79 therebetween, which spring 78 is coiled in a case 80 mounted on projector housing 18 so as to exert a resilient upward force on the projector and to carry substantially the entire weight thereof resiliently against the force of gravity. The actual and precise adjusting position of projector housing 18 vertically on rails 70 and 71 is achieved by a motor-driven rack-and-pinion arrangement comprising a toothed rack 85 between rails 70 and 71 and rigidly mounted vertically between cross bars 79 and 86 thereof. Within projector housing 18 and between side flanges 76 thereof is an electric motor 87 driving a pinion 88 (preferably through a speed reduction drive in known manner) in meshing engagement with rack 85. Motor 87 is of the reversible variety, and is preferably controlled by a remote switch 90 having "forward" and "reverse" push buttons, all in known manner, whereby the operator, by pushing either of the switch buttons, can cause the rotation of motor 87 in either direction to move the entire projector housing 18 up or down rails 70 and 71 (as indicated by the dot-dash showing in FIG. 2) as the motor-driven pinion 88 meshes with rack 85.

Projector housing 18 is satisfactorily formed of sheet metal and includes, in addition to the foregoing supporting arrangements, a light source in the front part of the housing and an optical mirror 95 disposed at approximately 45°. At the top of projector housing 18 and above mirror 95 is a light condenser 96 and a flat glass support surface 97 for receiving and supporting photographic transparency 22 the image of which is to be projected onto background screen 20. Although the condenser system 96 may be a conventional system of glass projection condensers, it is preferred (for increased versatility and saving in weight) to utilize one or more relatively thin transparent plastic sheets inscribed with a multitude of fine concentric circles to form a fresnel-type condenser lens system or structure.

In the illustrated embodiment, a multiple light source is provided in the front of the projector 18 to provide different lights for focusing the composite scene to be photographed and for photographing it. That is, a conventional tungsten filament projector lamp is indicated at 100 mounted in a conventional socket 101, while there is shown (FIGS. 5 and 6) also a conventional electronic flash tube 102 mounted in its socket 103. Both lights 100 and 102 and their respective sockets 101 and 103 are illustrated as mounted on a sliding support 105 free to slide from side to side across the front of projector housing 18 from the position shown in FIG. 6 bringing flash tube 102 into the center of the projector to a right-hand position bringing tungsten lamp 100 to the center of the projector. Suitable power sources and switches (conventional and not shown except as indicated by wire 117) are provided for lighting selectively either tungsten lamp 100 or flash tube 102, depending upon which is in the central position within the projector.

The light compartment 110 of the projector housing 18 is preferably separated from the compartment including mirror 95 as by a partition 111, having a central opening therein, including a light condenser 112. The bottom part of light compartment 110 is preferably open or slotted to permit sliding carriage 105 back and forth to bring whichever light is desired into a central operating position adjacent condenser 112. As indicated in FIGS. 2 and 5, a door 113 is preferably provided in the front of projector housing 18 for ready access to light chamber 110 therein, which door also contains affixed to the inside thereof a light reflector 114, although such reflector can readily be provided separately for either or both of the light sources 100 or 102 as may be desired for achieving the particular efficiency and fineness of projection for varying photographic or other conditions as desired.

As an aid to dissipating the heat of the projector lights in chamber 110, perforations or openings may be provided in the bottom thereof and/or in the sides of the sheet metal projector housing 18, and ventilating louvers 115 are illustrated in the upper portion thereof. If desired, a ventilating blower (not shown) is incorporated in the projector housing 18 for forced draft ventilation and cooling of light chamber 110 therein in known manner for prolonging the life of the lights being utilized as well as to avoid excessive heating of the projector structure and the transparency 22 thereon. The illustrated provision of electronic flash tube 102 is particularly for situations where the photographer intends to utilize such conventional electronic flash lighting for his photograph, in which instances enhanced results are achieved by also using a simultaneous electric flash for projecting the background image to screen 20. In other instances where the photographer may desire to utilize only tungsten lighting for his photograph and/or tungsten lighting for the projected image, the multiple light source in projector 18 may not be necessary.

As will be apparent from the foregoing, with the apparatus arranged as illustrated, light from lamp 100 or flash tube 102 in projector housing 18 is upwardly reflected by mirror 95 therein, suitably condensed or straightened by condenser system 96, and passes upwardly through transparency 22, lying on glass plate 97, and preferably mounted in or surrounded by a suitable masking frame indicated at 116. The resulting image enters projection lens 57, where it is suitable refracted and focused, and impinges upon pellicle 65. As indicated particularly in the diagram of FIG. 8, such projection image light (designated by arrows 120) strikes diagonal pellicle 65, and part of the projected image is reflected by the pellicle to the left as indicated by arrows 121, while the remainder passes through the semi-transparent pellicle, as indicated by arrows 122, to enter a light trap 125 at the top of housing 16. Light trap 125 is merely a hollow closed and slanting offset portion at the top of housing 16 in which the inner walls are slanted as illustrated so that any light entering light trap 125 is reflected back and forth between opposite walls thereof to be lost in infinity (somewhat as indicated by the arrows 126) rather than being reflected back downwardly into housing 16. In this manner, the image of transparency 22 on projector 18 is projected, focused, and reflected from pellicle 65 to projection screen 20.

A light image to be received by camera 14 and recorded on photographic film at the back 36 thereof is produced by the various people or objects 24 to be photographed and the projected image on screen 20. Light from such composite image enters the open front of housing 16 (along the same axis as arrows 121 in FIG. 8) and passes through pellicle 65 into camera lens 39 to be recorded photographically on the film in the camera in conventional manner. Any portion of the entering light image reflected by the left-hand or lower front surface of pellicle 65 (instead of transmitted through the pellicle to the camera) is harmlessly reflected downwardly without effect, and any light reflected above or from the right-hand surface of pellicle 65 is lost in light trap 125 and does not enter the camera at all. Even the reflection on the right-hand or upper side of pellicle 65 of the camera lens itself (some such reflection occurring because of the semi-reflecting nature of pellicle 65) is harmlessly reflected up into light trap 125 and lost, rather than being reflected back into the camera and recorded on the photograph as a ghost image or other undesired imperfection.

Focusing of the projected image from transparency 22 onto projection screen 20 is achieved by moving projector housing 18 up or down on rails 70 and 71 (with the motor-driven rack-and-pinion arrangement 85–88, etc.) and not by moving or adjusting or focusing projection lens 57, as in the usual case. That is, in accordance herewith projection lens 57 remains fixed on lens mount 56 in housing 16, and any necessary focusing movement of the projector is achieved by moving transparency 22 with respect to lens 57, rather than moving the projection lens with respect to the stationary transparency as in the usual projection technique. Similarly, the focusing of camera 14 on the scene to be photographed is accomplished, in conventional manner with a view camera, and camera lens 39 remains fixed with respect to housing 16, while focusing is accomplished by moving camera back 36 with respect to lens 39 instead of the reverse situation which obtains with some types of cameras. In this manner, the situation is maintained where the axis of projection lens 57 (arrows 120 in FIG. 8) always intersects the axis of camera lens 39 (arrows 123) at the plane of pellicle 65 and, preferably, at the left-hand or lower plane surface thereof, thus avoiding distortions or halo effects or shadows of the real objects 24 being photographed against the projected background on screen 20.

The foregoing arrangement, then, is as indicated in FIG. 1, where a background scene from transparency 22 is projected on screen 20 to form the desired background for the photograph. People or objects 24 are then positioned in front of this projected background, and the whole scene photographed by camera 14 through the semi-transparent mirror or pellicle 65. As will be understood, of course, portions of the projected image from transparency 22 actually strike the front surface of the people or objects 24 being photographed, but such parts of the projected image are not noticeable (or at least, not recorded by camera 14) because of a variety of factors including, for example, the fact that the projected image may be out of focus at the plane of the objects 24 and, more importantly, the fact that the reflective characteristics of the clothing or skin or surfaces of the people or objects 24 are not sufficiently sensitive to reflect any portion of the reflected image back to the camera 14.

As well understood, in this connection, the reflective characteristics of background screen 20 should be both highly efficient and, preferably, highly directional. Although a variety of materials are available for providing a suitable reflective surface for projection screen 20 to produce satisfactory results in accordance herewith, it is most preferred that the reflective surface of the screen 20 be formed of the type of reflective sheet materials comprising tiny glass or other transparent spheres embedded to one extent or another in reflective plastic material. For the most preferred results here, such screen material should be somewhat more than merely reflective in that the projected light should be somewhat refracted and actually magnified as it passes through the tiny spheres and returns toward the camera.

Similarly, most preferred results are achieved if the reflective characteristics of the screen material are highly directional so that each tiny refracting and reflecting sphere returns the light which strikes it virtually directly back along the incident path, rather than diffusing or scattering the light being reflected. In addition to concentrating the intensity and brilliance of the reflected image, such directional characteristics also aid in the elimination of any portions of shadows cast on screen 20 by the objects 24 being visible around the objects from the camera axis. Satisfactory results are achieved in accordance herewith, for example, with such reflective sheeting of a highly directional nature such that the light reflection from the screen material is not visible from a position more than 25° or 30° on either side of the path of incident light to the screen—although such specific degree of lenticular reflection is not critical here and is readily varied in the manufacture of the particular screen material and depending upon a number of factors among which may be noted the extent to which the individual tiny spheres are buried or enclosed within the plastic layer in which they are embedded. Such reflecting surface sheeting is available and supplied in a manner which can readily be applied to a canvas or other flexible or rigid backing to provide a smooth or stretched projection screen 20 of virtually any size that may be desired, in various ways.

As illustrative, satisfactory results are achieved in accordance herewith by adhering such reflective sheeting to a sheet of canvas backing material utilizing a heat sensitive adhesive and by butting the edges of strips of the reflective sheeting. More particularly, such reflective sheeting is commercially available in rolls of approximately 3 feet in width, and with a heat sensitive adhesive already applied to the back of the sheeting. In applying such strips of sheeting to backing material, as will be understood, some care should be exercised so that wrinkles are avoided and the seams between adjacent strips are as invisible as practicable.

Satisfactory results are achieved by adhering or applying the reflective sheeting to the canvas backing by hot pressing as with a heated iron or the heated platen from a photographic mounting press. Yet some difficulty may be experienced in such hot pressing if portions of the adhesive adjacent the edges of the plastic sheeting are squeezed out to form dark lines in the seams between two adjacent strips. Such difficulties have been avoided in connection herewith, however, by following a technique comprising applying one strip of sheeting to the backing by the above noted hot pressing technique. The next adjacent strip is applied with a slight overlap (perhaps 1/16") instead of a truly butted seam. In hot pressing the second strip, then, care is taken to bring the pressing iron only up to the overlap, but not all the way to the edge of the overlapping strip, thus to avoid softening or squeezing any of the adhesive at the edge out from under the reflective sheeting where it would be visible. The narrow non-adhering overlap will be found to retain its position even though not adhered. As will be apparent, if the type of sheeting used is that sold with a protective strippable covering over the reflective surface, such covering is stripped away from the first piece of sheeting applied before the second piece is applied with the slight overlap at the seam between the two.

Although it is primarily desired in accordance herewith for the axis of the projected image to intersect the axis of the camera lens (as diagrammed in FIG. 8) so that the composite image of actual objects 24 and projected background 20 are "viewed" by camera 14 from a point absolutely coaxial with the incident path of the projected image, there is also incorporated in the apparatus hereof a variety of provisions for enabling any number of standard camera movements or tilts or swings as may be required or desired by the purely photographic or artistic demands of the particular scene being photographed. Thus, the photographer still has complete versatility in the positioning or composing of the various objects being photographed and the camera without either of the disadvantages of distorting the projected background image or limiting the artistic latitude of the photographic camera.

For example, the particular photographic effect intended may require that the tripod or camera stand 10 be raised and the camera 14 be tipped or tilted downwardly, as illustrated in FIG. 9. Thus, tripod 10 is extended, in known manner, and the head thereof tilted downwardly about pivot 135 so that the entire main frame 12 and camera 14 thereon is tilted to point downwardly in the same manner as the camera itself would be tilted if mounted alone on tripod 10 in the conventional manner. If depending rails 70 and 71, carrying projector housing 18, were to remain perpendicular to main frame 12 in the tilted position thereof as in FIG. 2, the projection of the image from transparency 22 would be distorted on screen 20 as well understood with the projection of an image onto a screen where there is a lack of parallelism between the image and the screen.

In order to correct and maintain the desired alignment of the image from transparency 22 with projection screen 20 notwithstanding the fact that camera 14 is to be tilted one way or the other, depending rails 70 and 71 are pivotally connected (at 72 and 73) with frame 12 so that, after the desired angle of camera 14 is set, rails 70 and 71 may be moved with respect to frame 12 to reestablish the desired orientation of the plane of transparency 22 with the plane of background screen 20. In the situation illustrated in FIG. 9, for example, the entire projector housing 18 and depending rails 70 and 71 have been pivoted to the left so that the rails 70 and 71 are still essentially parallel to the plane of screen 20 notwithstanding the tilted or downwardly inclined adjustment of main frame 12 with camera thereon.

As will be understood, particularly by reference to the arrangement of FIG. 2 and the diagram of FIG. 8, such movement of rails 70 and 71 and projector housing 18 with respect to main frame 12 and housing 16 thereon would result in misalignment of the desired axial intersection of camera lens 39 and projector lens 57 and/or in a misalignment of transparency 22 on projector housing 18 and projector lens 57 intended to receive and project the image therefrom.

Nevertheless, there is provided in accordance herewith for correcting such a situation and maintaining the desired alignment and adjustment of all the various operative and optical elements of the apparatus notwithstanding desired tilting or angling of camera 14. As indicated in FIG. 9 and as diagrammed in FIG. 10, after the top surface of projector housing 18 and transparency 22 thereon is appropriately aligned to be perpendicular to projection screen 20, lens board 56 and the lens mounting 58 thereon are tilted, as by adjusting screws 61, until projection lens 57 is again correctly aligned as parallel to transparency 22, with such tilting of projection lens 57 being accommodated with respect to housing 16 by bellows 62 in known manner. Thus, the desired tilting or positioning of camera 14 is first achieved, and thereafter rails 70 and 71 are moved to re-establish alignment or parallelism of projector housing 18 as desired, and then projector lens 57 is tilted or otherwise adjusted so as to produce the desired projected effect on projection screen 20 to establish or reestablish the desired projection of the image from transparency 22 for whatever position is intended or desired for main frame 12, camera 14, etc.

Figure 10:
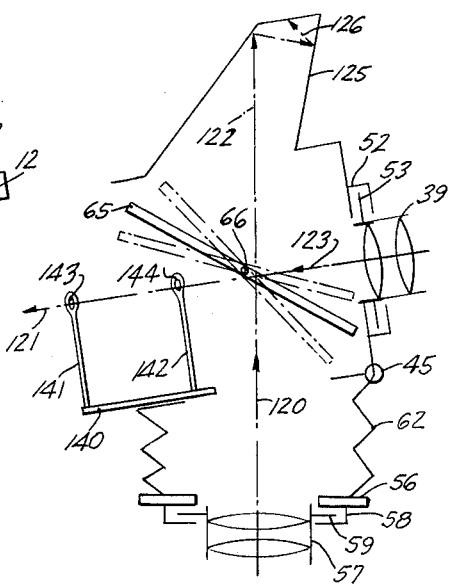
FIG. 10 is a diagrammatic view like FIG. 8 but indicating the arrangement when the apparatus is adjusted as in FIG. 9.

Such tilting of camera 14 and adjustment of projector housing 18 and projector lens 57, of course, alters the desired alignment (as depicted in FIG. 8) of projector lens 57 and camera lens 39 so that the respective axes thereof no longer would intersect in the plane of pellicle 65. To reestablish such desired alignment, after a tilting adjustment as indicated above, pellicle 65 is pivoted about the pivot points 66 thereof until the axis of projector lens 57 (represented by arrows 120) once again intersects the axis of camera lens 39 (arrows 123) in the plane of pellicle 65. That is, as indicated by comparing the diagrams of FIGS. 8 and 10, pellicle 65 is pivotable about pivot point 66 (as indicated by the dot-dash line showings in FIG. 10), and, with housing 16 tilted as indicated in FIG. 10, the axes of camera lens 39 and projector lens 57 no longer meet at a right angle, as in FIG. 8. Nevertheless, pellicle 65 is pivoted from the position shown in FIG. 8 to the full line position of FIG. 10 so that the intersection of arrows 123 and 120 still occurs in the plane of pellicle 65, although at a different point thereon.

Although the accuracy of such adjustment (for the reasons explained below) is quite critical and important for the securing of satisfactory photographic results, the adjustment itself is quite simply and readily accomplished with the apparatus hereof and utilizing conveniently inherent characteristics thereof. Thus, since pellicle 65 is intentionally a semi-reflecting surface, merely looking into the open front (i.e., left-hand side) of housing 16 renders readily visible camera lens 39 (viewed through pellicle 65) and a superimposed image of projector lens 57 (reflected from the left-hand or lower surface of pellicle 65). It is only necessary, then, to move pellicle 65 manually about pivot points 66 thereof until the reflected image of projection lens 57 is absolutely superimposed upon the real image of camera lens 39 viewed through the pellicle 65. Such adjustment is also greatly facilitated if the shutter of camera 14 is opened (so light is visible through lens 39 from the ground glass back 36 of the camera if it is a view camera), and if the irises conventionally arranged in both camera lens 39 and projector lens 57 are stopped down to the smallest opening—in which situation a readily visible tiny point of light is seen through or on pellicle 65 for each of camera lens 39 and projector lens 57. Thus, it is only necessary to pivot pellicle 65 until the reflected point of light from projection lens 57 is exactly superimposed on the real point of light from camera lens 39.

As indicated in FIG. 10, the accuracy of such an adjustment is further aided by the utilization of a sighting accessory 140 comprising merely two upright wires 141 and 142, each of which has a small sighting hole or aperture in an enlargement 143 and 144 at the top thereof. The height of uprights 141 and 142 is specifically selected so that the center or sighting line through apertures 143 and 144 is precisely coaxial with the center of the lens-receiving diaphragm 53 in collar 52 for accommodated lens 39 on camera 14. Thus, with sighting device resting on the bottom of the inside of housing 16, sighting the above noted point of light in camera lens 39 by looking through apertures 143 and 144 automatically aligns the operator's eye with the axis of camera lens 39, so that the pellicle 65 need only be moved or pivoted until the reflection of a spot of light from projection lens 57 is brought into alignment, at which time the pellicle is properly adjusted, and the sighting device 140 merely removed and put aside. Although satisfactory results in accordance herewith are achieved by having pivot point 66 for pellicle 65 formed as screws through the sides of housing 16 so the pellicle 65 will remain in any particular angular position in which it is placed by friction alone, pivot screws 66 may, of course, be adjustable or tightened if desired.

As will be apparent from the foregoing, such an adjustment of pellicle 65 need not be made before taking each photograph, but is only necessary when the angular relationship of main frame 12 and projecting housing 18 (or, concomitantly, the axis of camera lens 39 and projector lens 57) is altered for some reason such as a special effect or positioning of camera 14. As will also be understood, the utilization of a collapsing diaphragm arrangement 53 for positioning camera lens 39 with respect to the opening in the back of housing 16 (or, more properly, for positioning the height of housing 16 on uprights 42 and 43 with respect to a particular camera lens 39) assures the ready coaxial alignment of whatever camera lens is used within diaphragm 53 and collar 52 on housing 16. Thus, although diaphragm 53 need not hold or grip camera lens 39 for purposes of support, the fact that the diaphragm can be closed concentrically around the outside of camera lens 39 assures the original placement and adjustment of the apparatus with camera lens 39 exactly axially aligned within collar 52 and, consequently, precisely aligned for subsequent adjustment of the other parts with respect to housing 16.

Although there is illustrated in FIGS. 9 and 10 only one particular situation where camera 14 (and the axis of lens 39 thereof) and main frame 12 and housing 16 are adjusted or moved out of a perpendicular relation with depending arms 70, 71 and projector housing 18, it is to be understood that a variety of such swings and tilts for various portions of camera 14 and the related apparatus may be necessary or desired to obtain certain photographic results. For example, with a conventional studio view camera, the adjusting devices such as upright 40 for lens mounting 38 and 41 for the back of the camera are specifically and conventionally provided so that either or both of lens board 38 or camera back 36 may be tilted with respect to each other or with respect to base 35 of the camera, and can also be raised or lowered, whether or not tilted, to accommodate a variety of known photographic adjustments or expedients. Any of such tilts or swings or adjustments which are desired may be used with camera 14, notwithstanding the incorporation or integration thereof into the apparatus in accordance herewith.

As the photographer makes whatever adjustments of camera 14 or the parts thereof that may be required, he merely follows such tilting or other adjustments with housing 16, which, as noted above, is arranged to undergo or accommodate a variety of positionings by virtue of adjusting screws 45 and 48 in slots 46 and 47 of uprights 42 and 43. Generally speaking, housing 16 is adjusted by such means so that the back or right hand surface thereof remains generally parallel to camera lens board 38 in whatever tilted or other position the photographer desires for the camera (whether achieved by tilting main frame 12 on tripod 10 or merely by tilting lens board 38 itself for some particular reason). Thereafter, as explained above, projector housing 18, projector lens 57 and mounting board 56 therefor, and pellicle 65 are merely adjusted to accommodate or reestablish the desired perpendicular positioning between projector lens 57 and screen 20 as well as the desired adjustment of pellicle 65 so that the axes of projection lens 57 and camera lens 39 intersect in the plane thereof. Thereupon, the apparatus is set automatically to provide the desired composite effect for recording on the photographic film in camera 14.

As will be noted, such swings and tilts of camera 14 or the lens and back thereof or projection lens 57 may have the effect of moving a particular part of either the projected image on the screen or the viewed image on the film in camera 14 so that a different portion of transparency 22 is projected onto the screen or a different portion of the entire scene is focused on the film in back 36 of camera 14. Such movement, however, is not disadvantageous and, indeed, it is intentionally to achieve such movements that certain of the swings or tilts on camera 14 may be used in the first place. Nevertheless, in the construction illustrated, transparency 22 (in frame 116 therefor) is merely lying on top of projector glass 97 on projector housing 18, so that merely sliding transparency 22 to one position or another on top of projector housing 18 has the effect of moving the projected image with respect to screen 20, yet without interfering with the focusing of the image previously achieved.

In this way, after the apparatus is completely otherwise adjusted and focused and set, any particular portion or positioning of the image from transparency 22 is readily changed or located on projection screen 20 as may be desired so that a particular portion of the background projection may be moved or otherwise properly composed with the real persons or objects 24 to suit the photographer's desires or needs without having to change any of the adjustments which may previously have been made to the camera or the projector for other purposes. Indeed, two successive photographs may be taken with the objects 24 positioned in front of two completely different portions of the projected background image without changing or moving anything other than merely sliding transparency 22 a little bit one way or the other on the top of projector housing 18.

In the foregoing connection, the particular size and focal length of projector lens 57 is selected, in accordance with completely known and well understood considerations, depending upon such factors as the size of original transparency 22 (or the area thereof intended to be projected) and the extent or magnitude of projection desired in the final projected image on screen 20. Generally, it is preferred to utilize as projection lens 57 a large diameter zoomar projector lens so that a variety of extents of size increase or projection is readily available from a single transparency without changing projection lenses and depending upon the desired size of the image on screen 20 and the desired degree of enlargement of the original transparency 22, as well as to permit taking successive photographs with the camera closer or farther away from screen 20 without also necessarily changing the size of the projected background image with respect to the objects 24 positioned in front thereof.

Satisfactory results in accordance herewith are achieved, however, by the utilization of various different projector lenses 57 to provide various different focal lengths and extents of projection enlargement, etc., although, as explained below, it is not preferred to have the diameter of projector lens 57 less than the diameter of camera lens 39. The foregoing illustrates a further advantage achieved by the tilting adjustments of projector lens 57 provided by lens mounting 56 and bellows 62, as well as the above noted adjustment of pellicle 65. Thus, various different sizes or focal lengths of projection lenses may extend upwardly within bellows 62 or housing 16 to different extents as properly clamped therein by lens mounting 56, 58, 59, etc. In the course of tilting the projection lens to maintain the axis thereof perpendicular to transparency 22, the extent to which the intersection of axis 120 of the projector lens is moved along the surface of pellicle 65 by such tilting will vary for different lenses, since the tilting adjustment occurs at the axis of screws 61 in lens board 56. Nevertheless, and despite the almost infinite variety of such possible situations, they are readily accommodated by the foregoing adjustments in that the desired intersection of projector lens axis with camera lens axis in the plane of pellicle 65 is established—virtually regardless of the extents of tilts of either projection lens 57 or camera lens 39 or housing 16—merely by adjusting the tilted or pivoting positioning of pellicle 65 within housing 16 in the manner described above and by sighting into the front of housing 16 and adjusting any reflected image in the pellicle 65.

Because such an arrangement in accordance herewith can accommodate such a wide variety of cameras, camera lenses, projector lenses, and an infinitude of independent or related adjustments thereof, the disclosure of absolute or critical dimensionings for the various parts is neither necessary nor helpful. One should note, however, two sources of error or unsatisfactory results which can readily be avoided and which may also serve as some further exposition of the teachings and concepts in accordance herewith.

Figure 11:
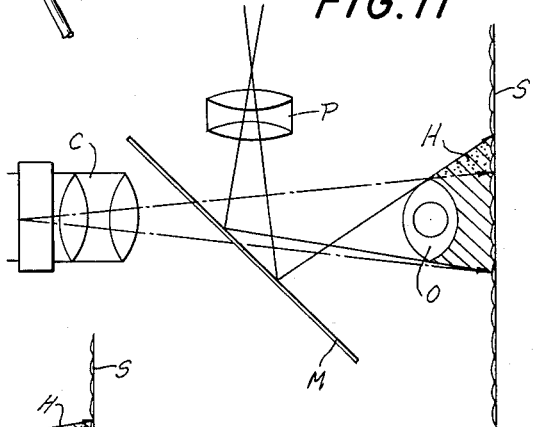
FIG. 11 is a diagram illustrating the undesired situation obtained in an arrangement when the projector lens axis and the camera lens axis are not precisely aligned on the semi-transparent surface.

One of such undesired situations has been alluded to above and is diagrammed in FIG. 11 in which the projection screen is designated by S, the projector lens by P, the camera lens by C, the semi-transparent minor or pellicle by M, and an object to be photographed by O and positioned in front of screen S. The path of the image being projected on screen S from projector P (and being reflected from one surface of mirror M) is indicated by the full line arrows, while the area being "seen" by camera lens C is indicated by the dot-dash arrows. In the undesired situation diagrammed in FIG. 11, however, the axes of projector lens P and camera lens C do not intersect in the plane of mirror M, so that a shadow or halo (indicated by the stippled area marked H) would be "seen" by camera lens C at one side of the object O being photographed against the projected image on screen S.

That is, since the entire image on screen S is being projected from in front of the screen, any object O interrupts such projection and casts a shadow (indicated by the cross-hatched area in the diagram) on that part of screen S which is directly behind object O. So long as the axes of projector lens P and camera lens C are aligned to intersect in the plane of mirror M, however, such shadow is directly behind object O and cannot be "seen" by camera lens C. In the diagram, however, the misalignment of the camera and projector lenses means that part of the cross-hatched shadow area cast by object O in the projected image is visible to camera lens C at one side of object O and, hence, would be recorded in the photograph as a halo or shadowy outline around the object. As will be apparent from FIG. 11, merely moving mirror M somewhat to the right so that the respective full line and dot-dash line arrows intersect in the plane of mirror M has the effect of limiting the shadow cast by object O to an area on screen S entirely behind object O and which cannot be "seen" by camera lens C.

Figure 12:
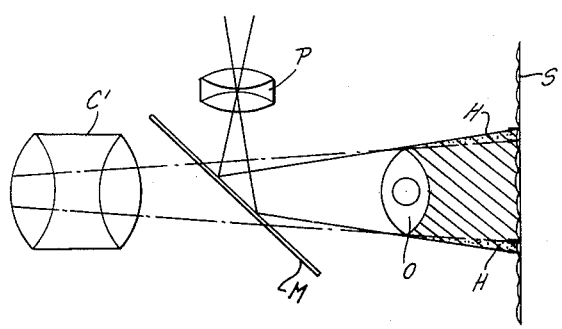
FIG. 12 is a diagram similar to FIG. 11 illustrating the undesired halo or shadow effect obtaining when projector lens elements and camera lens elements are inappropriately sized.

Another undesired situation is diagrammed in FIG. 12 as indicating the undesired result obtained when the effective diameter of the camera lens is larger than that of the projection lens. The reference characters are the same except that the camera lens is designated as C′ and is shown as being of substantially greater diameter than projector lens P. Also the projected image is again indicated by full line arrows, while the image "seen" by camera lens C′ is indicated by dot-dash arrows. Again, of course, a shadow is cast on screen S by object O as the object interrupts the projected light image from projector lens P and mirror M. Because the effective useful diameter of camera lens C′ is larger than that of projector lens P, lens C′ has a different angle and, in this case, can actually "see" a part of the cross-hatched shadow as a halo on both sides of object O—which would not be the case if the angle between the camera lens dot-dash arrows were the same or greater than the angle between the full line projected image arrows such as is the case when the effective diameter (not merely the iris aperture diameter) of the projection lens is at least as great as that of the camera lens. Accordingly, it is preferred in accordance herewith to utilize fairly large diameter lenses, not only for the foregoing reason, but also as a means of enhancing the versatility and utility of the apparatus for accommodating transparencies of widely varying sizes.

Merely as illustrative, satisfactory results have been achieved in accordance with this apparatus by selecting for projection lens 57 lenses which have the shortest focal length commensurate with the extent of enlargement or projection desired and the largest lens diameter practicable. As noted above, the diameter is actually the effective diameter of the glass, and not merely the diameter of a particularly stopped down iris aperture. By selecting projection lenses in this manner, they can be useful with a wider variety of camera lenses, although it is to be understood that the diameter relationship of projection and camera lenses here is primarily an indication of the angle of the lens as above noted and at the particular aperture opening or f/ stop being used, so that the effective diameter of the projection lens is at least as great as the effective diameter of the camera lens as used. Thus, two different lenses may be designed to have different diameters for the same f/ stop. If the projection lens aperture is open to f/3.5 and the camera lens is set at f/11, satisfactory results are achieved if the actual diameter of the projection lens at that setting is greater than the camera lens at that setting, and despite the fact that the effective diameter of the same camera lens at f/3.5 might be larger than the diameter of the projector lens.

Nevertheless, the apparatus in accordance herewith provides a simple and ready means for assuring the desired or preferred relationship of the projection and camera lens for the particular diaphragm settings being utilized. Although the foregoing general rules are applicable, it may be found that some types of projection lens (particularly variable focal length zoomar lenses) may have an effective diameter which varies for different focal length settings. In any event, satisfactory results are achieved by merely observing the reflection of the open aperture of the projector lenses 57 on the bottom surface of pellicle 65 and comparing the diameter of such reflection visibly with the diameter of the open aperture of camera lens 39 at the particular setting to be used to taking the photograph. So long as the diameter of the projection lens aperture reflection on pellicle 65 is at least as great as the effective open diameter of the camera lens, the above noted halo difficulties are not encountered.

Obviously, many of such unnecessary complications are eliminated if the projector lenses are chosen originally to be generally larger than whatever camera lenses are being utilized. For example, considering a 14″ f/6.3 Ektar lens as generally illustrative of a large view camera lens (which lens has a diameter of approximately 2.25″), one can readily select suitable projector lenses which are effectively large in diameter and, hence, will accommodate all possible situations to be encountered in the use of such a camera lens in any setting. As illustrative of a satisfactory zoomar projector lens may be noted an f/3.5 Vario Heidrosmat (Rolli) lens with a focal length variable from 110 mm. to 160 mm. Similarly, satisfactory projection results (although not variable as with a zoomar lens) have been achieved using a Wollensak f/3.5 enlarging lens with a focal length of 7.25″. With such optical arrangement, satisfactory results have been achieved utilizing for pellicle 65 a coated plastic film pellicle of about 5″×7″ in an arrangement where the square sides of housing 16 are about 7″ square.

As will be understood, with regard to any of the foregoing, it is naturally necessary for the protographer to arrange the particular lighting of the objects in the foreground or in front of the projection screen so that such objects do not cast shadows on the screen from any of the various lighting sources, but this consideration is substantially the same as normally encountered in photography to avoid undesired shadows on scenery or backdrops as may normally be utilized, whether or not the background in projected. Similarly, the particular lighting of objects in the foreground must be arranged so that the full force thereof does not impinge directly on the projection screen in a mannr to wash out or interfere with the effect desired from a background image projected thereon, but, again, this is not substantially different from similar considerations to be encountered with a variety of projected background techniques and, indeed, is much less critical with arrangements in accordance herewith than is normally encountered with rear projection techniques where the background is projected through a translucent screen without the brilliance or intensity or directionally reflective characteristics as utilized in accordance herewith.

While the methods and forms of apparatus herein described constitute preferred embodiments of the invention, it is to be understood that the invention is not limited to these precise methods and forms of apparatus, and that changes may be made therein without departing from the scope of the invention which is disclosed in the appended claims.

What is claimed is:

1. In an integrated projector-camera device for projecting a background scene onto a remote screen and for simultaneously photographing said projected background scene on said screen and real objects positioned in front thereof by a split beam technique, the combination which comprises means for mounting a photographic camera and camera lens on said device, means for mounting a light projector and projector lens on said device for projecting said background scene onto said screen, semi-transparent reflecting means positioned on said device intersecting the optical axes of both said camera and projection lens for transmitting the image of said background scene and objects to be photographed to said camera lens through said reflecting means and for reflecting said background scene projected from said projection lens to said screen along a path substantially coaxial with the path of travel of said image to said camera lens, means for supporting a transparency of said background scene to be projected in operative relation with said light projector and said projector lens, a support for said integrated device, said camera mounting means and projection lens mounting means being rigidly integrated on said device for maintaining preset intersection of the optical axes of said camera lens and said projection lens in the plane of said reflecting means in any of a plurality of positions of said devices, and means for tilting said camera mounting means and said projection lens mounting means and said reflecting means together with respect to said support.

2. A split-beam projector-camera device as recited in claim 1 in which said means for focusing said light projector and said transparency with respect to said projection lens includes means for adjustably moving said projector with said transparency thereon toward and away from said projection lens effecting said focusing in the absence of movement or adjustment of said projection lens with respect to said camera lens and said mirror means.

3. In an integrated projector-camera device for projecting a background scene onto a remote screen and for simultaneously photographing said projected background scene and real objects positioned in front thereof by a split beam technique, the combination which comprises means for mounting a photographic camera on said device, a lens housing unit on said device having camera lens receiving means for receiving the lens of a camera mounted thereon for photographing both said projected background scene and said real objects through said lens housing unit, projection lens mounting means in said lens housing unit for receiving and mounting a projection lens therein for projecting said background scene onto said screen through said lens housing unit, semi-transparent and semi-reflecting mirror means in said lens housing unit and disposed substantially diagonally therein between said projection lens mounting means and said camera lens receiving means for transmitting the light image of said scene and objects to be photographed to a camera lens in said camera lens receiving means and for reflecting a background scene projected from a projection lens in said projection lens mounting means to said screen along a path substantially coaxial with the path of travel of said light image transmitted to said camera lens, a light projector mounted on said device and separate from said lens housing unit thereon, means for supporting a transparency of said background scene to be projected in operative relation with said light projector and a projection lens mounted in said projection lens mounting means, a projection light source in said light projector for directing light through said transparency and into a projection lens mounted in said projection lens mounting means for projection thereby, and means for adjusting said light projector and said transparency with respect to a projection lens mounted in said projection lens mounting means for focusing a light image of said transparency on said screen.

4. A split-beam projector-camera device as recited in claim 3 in which said camera mounting means and said lens housing unit are both carried by a main frame and said light projector is mounted on said main frame and depending therebeneath, and which also includes means for mounting said main frame on a tripod for supporting said entire device and a camera mounted thereon in operative relation to said screen and said objects to be photographed.

5. A split-beam projector-camera device as recited in claim 4 in which said lens housing unit and said depending light projector are mounted on said main frame for independent tilting adjustments with respect thereto and with respect to said screen and said objects to be photographed.

6. A split-beam projector-camera device as recited in claim 4 in which said light projector is mounted on rails depending from said main frame, and which also includes means for moving said projector and said transparency thereon up and down said rails adjustably with respect to said main frame and said lens housing unit thereon for focusing adjustment of said projector with respect to a projection lens in said projection lens mounting means on said lens housing unit.

7. A split-beam projector-camera device as recited in claim 6 in which said means for moving said light projector on said depending rails includes bearing rollers engaging said rails and rack-and-pinion means on said light projector and said rails for moving said projector therealong upon driving of said pinion in meshing engagement with said rack.

8. A split-beam projector-camera device as recited in claim 6 in which said means for moving said light projector on said depending rails includes bearing rollers engaging said rails and spring means for resiliently supporting substantially the entire weight of said light projector in any of a variety of vertical positions thereof on said depending rails.

9. A split-beam projector-camera device as recited in claim 6 in which said depending rails are pivotally supported on said main frame for tilting movement with respect thereto for adjusting the degree of parallelism between said rails and said screen on which said background scene is to be projected for various positions of said main frame with respect to said screen.

10. A split-beam projector-camera device as recited in claim 3 in which said camera lens receiving means in said lens housing unit includes an aperture in one vertical wall of said lens housing unit for receiving a camera lens therein and an adjustable annular diaphragm closure for closing down on the outside of the said camera lens in said aperture effecting automatic centering adjustment of said camera lens in said aperture, and in which said projections lens mounting means is in the bottom of said unit, said camera lens receiving aperture being substantially perpendicular to said projection lens mounting means in said unit, and being oriented with respect to said projection lens mounting means whereby the axis of a camera lens centered in said aperture intersects the axis of a projection lens mounted in said projection lens mounting means substantially in the plane of said mirror means in said lens housing unit.

11. A split-beam projector-camera device as recited in claim 10 in which said projection lens mounting means is adjustable for tilting and shifting both the axis of a projection lens mounted therein and the point of intersection of said axis with the axis of a camera lens centered in said camera lens aperture, and which also includes means for adjusting the position of said mirror means in said lens housing unit to position and maintain said intersection of said lens axes substantially in the plane of said mirror means notwithstanding said shifting of said point of intersection thereof by said adjusting of said projection lens mounting means.

12. A split-beam projector-camera device as recited in claim 3 in which said projection light source in said light projector includes a source of both tungsten incandescent light and an electronic discharge flash tube, and which also includes means for selectively operating each of said tungsten and flash sources and for selectively aligning each with said transparency for said projection thereof.

13. A split-beam projector-camera device as recited in claim 3 which also includes a generally horizontal main frame for supporting said lens-housing unit and said camera mounting means, means for mounting and supporting said light projector from said main frame and depending therebeneath for both the vertical and tilting adjustment with respect thereto, means for adjustably mounting said lens housing unit on said main frame with said projection lens mounting means facing downward toward said depending light projector, said transparency being supported on the top of said depending light projector in a plane generally perpendicular to the plane of said screen onto which said background scene is to be projected by a transparent plate at the top of said light projector in a line with the projection lens in said projection lens mounting means on said lens housing unit, a light condenser system in said light projector and beneath said transparent plate with said light condenser system including a thin plastic fresnel condenser underlying said transparent plate on said light projector and having a multiplicity of concentric light condensing grooves over the surface thereof, with said transparent plate separating said transparency to be projected from the plane of said concentric grooves to maintain a projected image of said grooves out of focus and invisible on said screen when a projected image of said transparency is in focus on said screen.

14. In a self-contained integrated projector-camera device for projecting a background scene onto a remote screen and for simultaneously photographing said projected background scene and real objects positioned in front thereof by a split beam technique, the combination which comprises means for supporting a photographic camera in operative position on said device, a lens housing unit on said device, camera lens receiving means in said lens housing unit for receiving the lens of a camera mounted on said device in position to photograph said projected scene and said objects through said lens housing unit, projection lens receiving means in said lens housing unit for receiving a projection lens in position to project said background scene onto said screen through said lens housing unit, semi-transparent and semi-reflecting mirror means in said lens housing unit and disposed substantially diagonally therein between said respective camera and projection lens receiving means for transmitting to a camera on said device a light image of said scene and said objects to be photographed through said camera lens receiving means and for reflecting onto said screen a projected image from said projection lens receiving means along a path substantially coaxial with the path of said light image transmitted by said mirror means through said camera lens receiving means, and a light projector also supported on said device but separately and spaced from said lens housing unit and adjustable with respect thereto for focusing a projected image of said background scene onto said mirror means and said screen, each of said lens housing unit and said light projector and said mirror means being separately and individually adjustable for the integrated self-contained operation thereof with respect to a camera mounted on said device and said background scene and objects to be photographed.

15. A split-beam projector-camera device as recited in claim 14 in which said lens housing unit comprises a generally rectangular box with an open front and having an aperture of variable size in the rear wall thereof for receiving a camera lens therein, projection lens mounting means in the bottom thereof for mounting a projection lens therein and including means for tilting the axis of a projection lens mounted therein with respect to said lens housing unit, and light tight bellows means connecting said lens mounting means with the interior of said lens housing unit, and a light trap in said lens housing unit for trapping and dissipating light transmitted or reflected by said mirror means in said unit along paths other than said path of travel of said light image from said scene and objects being photographed through said camera lens receiving means.

16. A split-beam projector-camera device as recited in claim 14 which also includes a main frame for supporting said lens housing unit and said camera, a pair of uprights on said main frame for mounting said lens housing unit therebetween, means for adjusting the height of said unit on said uprights with respect to a camera mounted on said main frame for aligning said camera lens receiving means on said unit with a lens in said camera, means for adjustably tilting said lens housing unit about a horizontal axis between said uprights for aligning said unit and said camera lens receiving means therein with different tilted positions of a lens in a camera mounted on said main frame, means for adjustably tilting said projection lens receiving means on said lens housing unit about a horizontal axis and separately from said tilting adjustments of said lens housing unit for establishing and maintaining alignment of a projection lens in said projection lens receiving means with said light projector in different tilted positions of said lens housing unit.

17. A split-beam projector-camera device as recited in claim 16 which also includes means for separately and adjustably tilting said mirror means and said light projector about horizontal axes for establishing and maintaining alignment of the axes of lenses in said respective camera and projection lens receiving means with said mirror means and with said screen onto which is to be projected said background scene in different tilted positions of said lens housing unit.

18. Photographic projector and camera apparatus for projecting a background scene onto a lenticular reflex reflecting screen and simultaneously photographing both said projected background scene reflected by said screen and real objects positioned in front of said screen by a split beam technique, comprising in combination a self-contained integrated projector-camera device for projecting said background scene onto said screen and for supporting a photographic camera to photograph both said scene as reflected by said screen and said real objects in front thereof, a camera mounted on said device, projection means including a projection lens and a projection light source and means for supporting a transparency of said background scene to be projected onto said screen, said projection means being mounted on said projector-camera device for adjustment thereon with respect to said screen for focusing thereon a light image of said background scene, a lens housing unit on said device and positioned to receive both said camera lens and said projection lens therein disposed with the axes thereof intersecting, semi-transparent and semi-reflecting mirror means in said lens housing unit and disposed substantially diagonally therein between said camera lens and said projection lens and at said intersection of the axes thereof for reflecting onto said screen a light image of said background scene projected by said projection lens and for transmitting to said camera lens a light image of both said background scene reflected by said screen and said real objects to be photographed along a path substantially coaxial with the path of said light image reflected by said mirror means onto said screen, and means on said device for individually adjusting each of said camera and projection means and mirror means with respect to each other and for the self-contained integrated operation thereof with respect to said screen and to said real objects to be photographed in front thereof.

19. In an integrated projector-camera device for projecting a background scene onto a remote screen and for simultaneously photographing said projected background scene on said screen and real objects positioned in front thereof by a split beam technique, the combination which comprises means for mounting a photographic camera and camera lens on said device, means for mounting a projection lens on said device for projecting said background scene, semi-transparent reflecting means positioned on the optical axes of both said camera and projection lenses for transmitting the image of said background scene and objects to be photographed to said camera lens through said reflecting means and for reflecting said background scene projected from said projection lens to said screen along a path substantially coaxial with the path of travel of said image to said camera lens, means for adjusting said projection lens relative to said reflecting means to position said lens optical axes to intersect the plane of said reflecting means for all said different positions thereof, means for positioning a transparency of said background scene to be projected in operative relation with said projection lens, a projection light source for directing light through said transparency and into said projection lens for projection thereby, and means for focusing said transparency with respect to said screen to form said background scene to be photographed.

20. In an integrated projector-camera device for projecting a background scene onto a remote screen and for simultaneously photographing said projected background scene on said screen and real objects positioned in front thereof by a split beam technique, the combination which comprises means for mounting a photographic camera and camera lens on said device, means for mounting a projection lens on said device for projecting said background scene, said projection and camera lens axes being positioned to intersect each other, semi-transparent reflecting means positioned on the optical axes of both said camera and projection lenses for transmitting the image of said background scene and objects to be photographed to said camera lens through said reflecting means and for reflecting said background scene projected from said projection lens to said screen along a path substantially coaxially with the path of travel of said image to said camera lens, means for setting the relative position of said projection lens and said reflecting means to locate said intersection of said lens axes at substantially the plane of said reflecting means for all said different positions thereof, means for positioning a transparency of said background scene to be projected in operative relation with said projection lens, a projection light source for directing light through said transparency and into said projection lens for projection thereby, and means for focusing said transparency with respect to said screen to form said background scene to be photographed.

21. In an integrated projector-camera device for projecting a background scene onto a remote screen and for simultaneously photographing said projected background scene on said screen and real objects positioned in front thereof by a split beam technique, the combination which comprises means for mounting a photographic camera on said device, a lens housing unit on said device for receiving the lens of a camera mounted thereon, a projection lens in said lens housing unit for projecting said background scene onto said screen, semi-transparent and semi-reflecting mirror means in said lens housing unit for transmitting the image of said background scene and objects to be photographed to said camera lens through said mirror means and for reflecting said background scene projected from said projection lens to said screen along a path substantially coaxial with the path of travel of said image to said camera lens, a light projector on said device, means for supporting a transparency of said background scene to be projected in operative relation with said light projector and said projection lens, a projection light source in said light projector for directing light through said transparency and into said projection lens for projection thereby, means for focusing said light projector and said transparency with respect to said projection lens and said screen to form said background scene to be photographed, said projector depending beneath said lens housing unit, the axis of said projection lens being substantially parallel to the plane of said screen onto which said background scene is projected, means provided for tilting said camera-mounting means to alter the angle between the axis of said camera lens and said screen onto which said background scene is projected, means for correspondingly adjusting the axis of said projection lens and the disposition of said transparency on said light projector for maintaining said projection lens axis substantially parallel to said screen notwithstanding said tilting of said camera mounting means and said camera thereon, and means for adjusting said lens housing unit and said mirror means therein to establish and maintain an intersection of the axes of the said camera and projection lenses substantially in the plane of said mirror means notwithstanding said respective tilting and adjusting thereof.

References Cited by the Examiner

UNITED STATES PATENTS

| | | | |
|---|---|---|---|
| 2,076,103 | 4/1937 | Thorner | 352—89 |
| 2,727,427 | 12/1955 | Jenkins | 352—89 |
| 2,727,429 | 12/1955 | Jenkins | 352—89 |
| 3,059,529 | 10/1962 | Lucas | 88—24 |

FOREIGN PATENTS 768,394    2/1957    Great Britain.

NORTON ANSHER, *Primary Examiner.*

WILLIAM MISIEK, *Examiner.*